Nov. 14, 1967 D. F. MOLINE 3,352,339
FRUIT JUICING ADAPTER FOR VEGETABLE JUICING MACHINES
Filed Jan. 10, 1966 2 Sheets-Sheet 1

DOUGLAS F. MOLINE
INVENTOR.

BY C. Lauren Maltby
ATTORNEY

Nov. 14, 1967  D. F. MOLINE  3,352,339
FRUIT JUICING ADAPTER FOR VEGETABLE JUICING MACHINES
Filed Jan. 10, 1966  2 Sheets-Sheet 2

DOUGLAS F. MOLINE
INVENTOR.

BY
C. Lauren Maltby
ATTORNEY

United States Patent Office 3,352,339
Patented Nov. 14, 1967

3,352,339
FRUIT JUICING ADAPTER FOR VEGETABLE JUICING MACHINES
Douglas F. Moline, Arcadia, Calif., assignor to Acme Juicer Mfg. Company, a corporation of California
Filed Jan. 10, 1966, Ser. No. 519,734
4 Claims. (Cl. 146—76)

This invention relates to food prepartion and more especially to machines for extracting juice from fruits and vegetables.

Fruit juicing apparatus, particularly for citrus fruits, is well known and has been developed over a long period of time. Such apparatus in its present development causes a certain amount of pulp to be separated from the fruit and mixed with the juice, and although straining is employed, considerable pulp is passed through the strainer. More recently machines have been developed for extracting juice from vegetables of a considerable variety, and these machines employ a high-speed comminuting rotating cutter within a centrifugating basket having a fine-mesh perforate wall. In such machines the extracted juice is free of pulp which is retained in the rotating basket.

The present invention has been developed and the principal object of the invention is to provide a fruit juicing adapter whereby fruit juicing operations may be carried out using the principal portions of a vegetable juicing machine.

Other objects and advantages will appear and be brought out in the following specification, reference being had to the accompanying drawing wherein.

Figure 2:
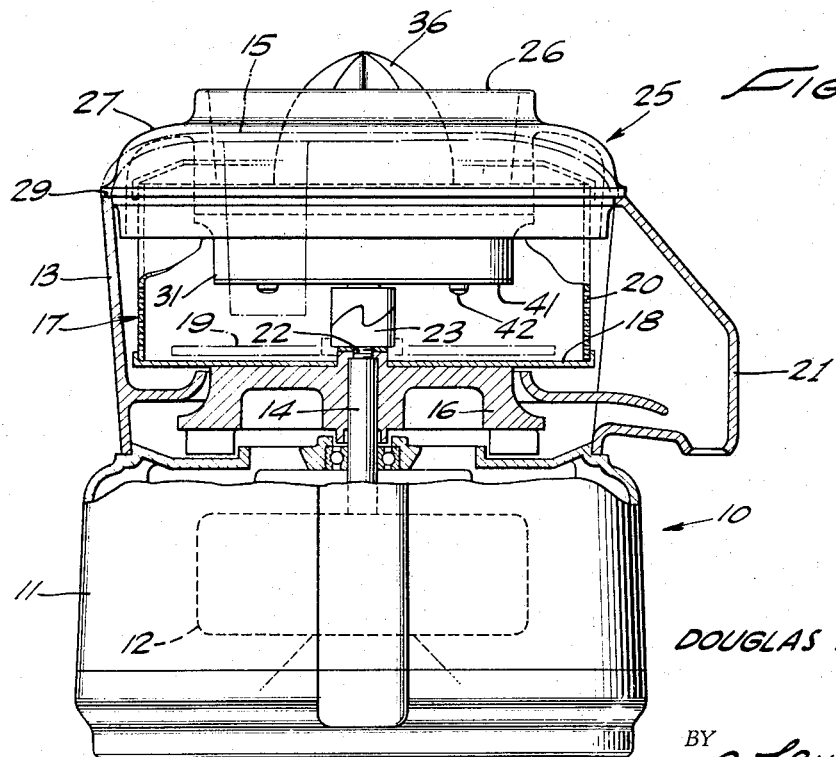
FIGURE 2 is an elevation view partly in section of the same.

Referring more particularly to the drawing, and especially to FIGURE 2, the numeral 10 indicates generally a vegetable juicing machine substantially as shown in my prior patent No. 3,165,132, having generally circular frame 11, in the lower portion of which an electric motor 12 is mounted. The upper portion of the machine includes an enclosure 13 which may be detachably mounted on frame 11 for the juice extracting apparatus of the invention. Motor 12 has a vertical drive shaft 14, and a cover 15 is provided for enclosure 13 when the machine is used for vegetable juicing operations. A hub 16 carries a basket 17 having a base plate 18 supported on the hub, the wall of the basket 20 being formed with fine-mesh perforations. FIGURE 2 shows in dotted outline a macerating disc 19 which is placed on base 18 of the basket when the machine is used for vegetable juicing. Enclosure 13 has a spout 21, and the upper end of shaft 14 is formed with threads 22 for a clamping nut 23 which secures the macerating cutting blade 19 on base 18 of the basket when the cutter blade is used for vegetable juicing operations.

Figure 1:
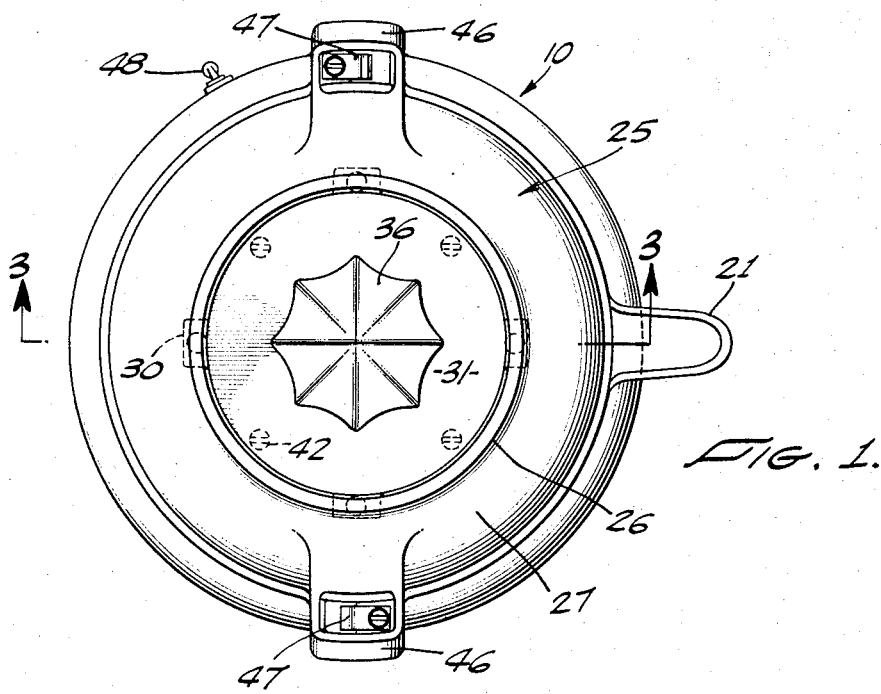
FIGURE 1 is a top plan view of a fruit juicing adapter embodying the invention.
Figure 3:
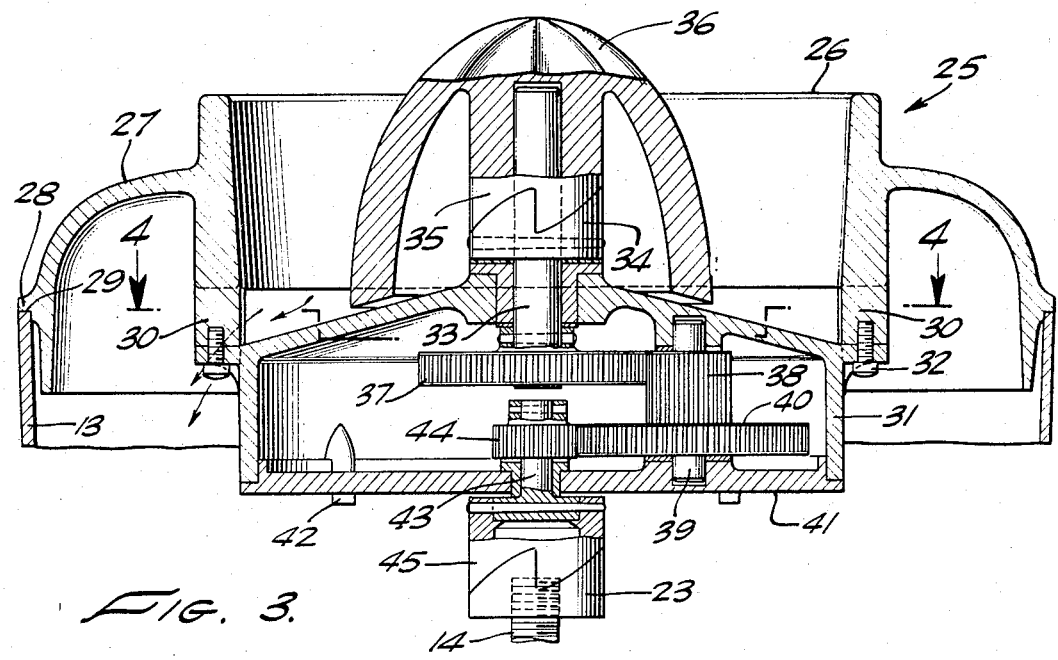
FIGURE 3 is a sectional view enlarged taken along the line 3—3 of FIGURE 1.
Figure 4:
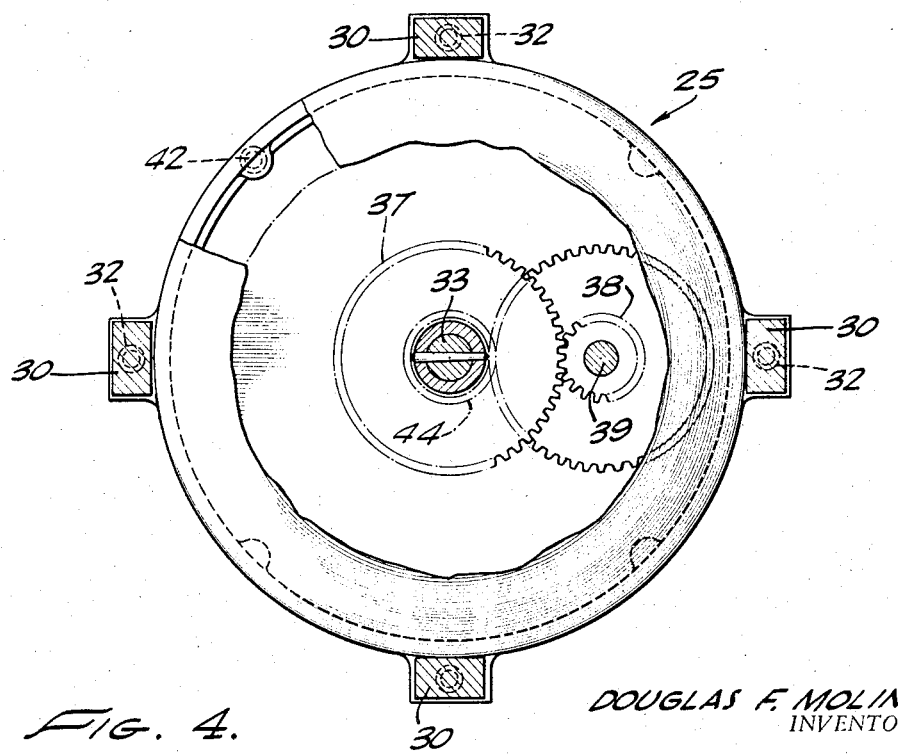
FIGURE 4 is a sectional view taken along the line 4—4 of FIGURE 3.

In FIGURES 1, 3 and 4 is shown a fruit juicing adapter 25 of this invention. The adapter comprises an annular wall member 26 having a downwardly depending skirt 27 formed with a flange 28 which seats on rim 29 of enclosure 13. The wall member 26 has a plurality of legs 30 to which is secured a gear train frame 31 as by screws 32. Frame 31 provides bearings for a stub shaft 33 to which is secured a drive clutch member 34 which mates with a driven clutch member 35 formed as a part of a fruit juice extracting device 36. Device 36 is generally dome shaped for extracting juice from fruits such as oranges, lemons, and others.

Shaft 33 secures a gear 37 which meshes with and is driven by pinion gear 38 secured on a shaft 39 which also mounts a gear 40, the gear train being supported on a bearing plate 41 mounted to gear train frame 31 as by screws 42. Plate 41 provides bearings for a stub shaft 43 which carries a driving gear 44. A clutch member 45 is secured on shaft 43 and mates with clutch nut 23 on shaft 14. The annular member 26 of the adapter has a pair of of ears 46 which extend radially over rim 29 and mount a latch device 47 carried by enclosure 13 adjacent the rim 29. A switch 48 is provided for motor 12.

The operation of the invention should be clear from the foregoing description. Motor 12 is a high-speed motor, and the gear train comprising gears 37, 38, 40 and 44 is a speed reducing unit. When the machine is operated the juice from the fruit drops into basket 17 and the juice is separated from the pulp by centrifugal action and passes through the holes in the basket wall, and is directed out through spout 21 to an appropriate receptacle. The pulp is retained in the basket for later removal.

For conversion to a vegetable juicing operation the juicing adapter 25 is removed by a slight rotation to release it from latches 47 and lifted upwardly, the clutch member 45 of the adapter unit separating from clutch member 23 on shaft 14 during this movement. Clutch member 23 is then unscrewed from shaft 14 and vegetable macerating cutter disc 19 placed in the basket and secured by replacement of clutch member 23 for equivalent clutch member provided with a slip drive of the cutter blade, as shown and described in my Patent No. 3,165,132. Cover 15 is then placed on enclosure 13 and latched by latch 47. The machine is now ready for vegetable juicing operation, as set forth in the above referred to patent.

What is claimed is:

1. A fruit juicing adapter for a vegetable juicing machine having a vertical cylindrical housing formed with a rim, a vertical rotary shaft, a vegetable comminuting cutter removably positioned on said shaft, and a cover seated on said rim, comprising; a frame formed to seat on said rim, a gear train carried by said frame, a juice extracting device driven by said gear train, and means to detachably secure said gear train to said shaft.

2. Structure according to claim 1 wherein said gear train is a reduction speed train.

3. Structure according to claim 1 including means to latch said frame to said rim.

4. Structure according to claim 1 wherein said means is a clutch.

References Cited

UNITED STATES PATENTS

| 2,315,018 | 3/1943 | Lawrence | 146—3 |
| 2,552,572 | 5/1951 | Mikina | 146—76 |
| 2,845,971 | 8/1958 | Cordero | 146—76 |

W. GRAYDON ABERCROMBIE, *Primary Examiner.*